United States Patent
Reiner

[19]
[11] Patent Number: 6,167,094
[45] Date of Patent: Dec. 26, 2000

[54] DATA TRANSMISSION CIRCUIT HAVING A STATION AND A RESPONSE CIRCUIT

[75] Inventor: Robert Reiner, Neubiberg, Germany

[73] Assignee: Siemens Aktiengesellschaft, Munich, Germany

[21] Appl. No.: 09/292,182

[22] Filed: Apr. 15, 1999

Related U.S. Application Data

[63] Continuation of application No. PCT/DE97/02187, Sep. 25, 1997.

[30] Foreign Application Priority Data

Oct. 15, 1996 [DE] Germany ............................ 196 42 568

[51] Int. Cl.[7] .............................. H04B 3/00; H04L 25/00; H04L 27/00
[52] U.S. Cl. .............................. 375/258; 455/41; 235/492
[58] Field of Search ...................................... 375/258, 261; 455/41, 558; 235/492, 487, 382

[56] References Cited

U.S. PATENT DOCUMENTS

| | | | |
|---|---|---|---|
| 5,260,701 | 11/1993 | Guern et al. | |
| 5,293,400 | 3/1994 | Monod et al. | 375/219 |
| 5,418,353 | 5/1995 | Katayama et al. | 235/380 |
| 5,473,323 | 12/1995 | Kreft | 340/10.34 |
| 5,519,729 | 5/1996 | Jurisch et al. | 375/259 |
| 5,889,273 | 3/1999 | Goto | 235/492 |
| 5,898,738 | 4/1999 | Nagata et al. | 375/326 |

FOREIGN PATENT DOCUMENTS

| | | |
|---|---|---|
| 0 609 964 A2 | 8/1994 | European Pat. Off. |
| 34 47 560 A1 | 7/1986 | Germany . |
| 2 232 851 | 12/1990 | United Kingdom . |

*Primary Examiner*—Don N. Vo
*Assistant Examiner*—Phuong Phu
*Attorney, Agent, or Firm*—Herbert L. Lerner; Laurence A. Greenberg; Werner H. Stemer

[57] ABSTRACT

A data transmission circuit having a station and a response circuit. The station has an amplitude demodulator as well as a primary coil with a signal generator for producing an alternating magnetic field at a carrier frequency. The response circuit has a secondary coil as well as an amplitude modulator for influencing a load on the secondary coil, and the amplitude modulator is configured such that the alternating magnetic field can be modulated with a data signal. Particularly when the data transmission circuit is mass-produced, situations frequently occur in which the data signal modulated onto the alternating magnetic field by the response circuit can no longer be reconstructed at the station end. The object of the invention is thus to provide a data transmission circuit of this generic type, which always operates reliably. According to the invention, the response circuit has a phase modulator for influencing the electrical characteristics of the secondary coil. The amplitude modulator and/or the phase modulator being configured such that it or they can be driven, in particular, by at least one activation signal.

36 Claims, 4 Drawing Sheets

DATA TRANSMISSION CIRCUIT HAVING A STATION AND A RESPONSE CIRCUIT

CROSS-REFERENCE TO RELATED APPLICATION

This application is a continuation of copending International Application No. PCT/DE97/02187, filed Sep. 25, 1997, which designated the United States.

BACKGROUND OF THE INVENTION

Field of the Invention

The invention relates to a data transmission circuit having a station and a response circuit. The station has an amplitude demodulator and a primary coil with a signal generator for producing an alternating magnetic field at a carrier frequency. The response circuit has a secondary coil as well as an amplitude modulator for influencing the load on the secondary coil, and the amplitude modulator is configured such that the alternating magnetic field can be modulated with a data signal.

Data transmission circuits of this generic type are used, in particular, in simultaneous powering and reading (SPR) systems where the power and data are transmitted inductively.

Such SPR systems are also used in applications with non-contact smart cards.

During use, the signal generator in the station produces a periodic signal on the primary coil, which results in an alternating inductive field or an alternating magnetic field being formed in its vicinity, which field acts as a so-called "close field" in an area around the primary coil. In contrast to an electromagnetic wave originating from the primary coil, the purely inductive effect of the signal emerging from the primary coil is the primary factor in the close field of the primary coil.

A response circuit which draws its operating power, in particular, from the alternating magnetic field can be moved into the area of the close field. For this purpose, the response circuit is equipped with a secondary coil, in which the alternating magnetic field induces an alternating voltage. The alternating voltage induced there is rectified and smoothed in the response circuit, and is supplied to a data signal production block. The data signal production block is connected to an amplitude modulator (which is disposed, in particular, in the vicinity of the secondary coil) in such a manner that it can vary the load on the secondary coil as a function of a data signal produced by the data signal production block.

To this end, it is known from the prior art for the amplitude modulator to be configured as a variable resistive load, with the resistance load on the secondary coil being varied in a suitable manner in accordance with the data signal. Such a change in the resistance load on the secondary coil results in the electrical characteristics of the primary coil at the station end also varying, since the primary coil and the secondary coil are inductively coupled. The coupling factor of the inductive coupling is, as a rule, between one percent and five percent.

The alternating magnetic field can be modulated with the data signal from the response circuit in the manner mentioned above when the response circuit is in the area close to the primary coil.

On the primary coil side, the amplitude demodulator samples the voltage dropped across the primary coil, which voltage varies with the data signal, and uses this to reconstruct the data signal.

The data transmission circuit of this generic type allows response circuits to be supplied with power in a reliable manner, while furthermore ensuring that a data signal transmitted by the response circuit can be read at the station end.

However, when data transmission circuits of this generic type are used in practice, it has been found that, particularly when the data transmission circuit is mass-produced, situations frequently occur in which the data signal modulated onto the alternating magnetic field by the response circuit can no longer be reconstructed at the station end. Particularly when a transmission circuit of this generic type is used on immobilizers intended for motor vehicles, this has led to the user of a motor vehicle not being able to use his motor vehicle, despite authorization.

Published, British Patent Application GB-A-2 232 851 discloses a loose-coupled transformer via which a measurement circuit, for example on a moving part of a vehicle, is supplied with power. The transformer is loaded by the measurement electronics via a switch, to be precise at a frequency which is an integer multiple of the power supply frequency. The periodic load is phase-modulated when the level of a binary data signal, which is transmitted by the measurement circuit, varies. The modulated signal is transferred back to the primary of the transformer, and is multiplied by a periodic signal in order to demodulate it for data recovery.

SUMMARY OF THE INVENTION

It is accordingly an object of the invention to provide a data transmission circuit having a station and a response circuit that overcome the above-mentioned disadvantages of the prior art devices and methods of this general type, which always operates reliably.

With the foregoing and other objects in view there is provided, in accordance with the invention, a data transmission circuit, including: a station having an amplitude demodulator, a primary coil connected to the amplitude demodulator, and a signal generator connected to the primary coil for producing an alternating magnetic field at a carrier frequency; and a response circuit having a secondary coil and an amplitude modulator for influencing a load on the secondary coil, the amplitude modulator configured such that the alternating magnetic field can be modulated with a data signal, the response circuit also having a phase modulator for influencing electrical characteristics of the secondary coil, at least one of the amplitude modulator and the phase modulator to be driven by at least one modulation signal.

The object is achieved according to the invention in that the response circuit also has a phase modulator for influencing the electrical characteristics of the secondary coil. The amplitude modulator and/or the phase modulator are configured such that they or it are configured such that they/it can be driven, in particular, by at least one modulation signal.

The subject matter of the invention is based on the knowledge that it is essential to the invention that, particularly when a response circuit is mass-produced, the primary circuit with the primary coil and the secondary circuit with the secondary coil can be mistuned owing to manufacturing tolerances. With certain coupling factors, which are dependent in particular on the distance between the secondary coil and the primary coil, this leads to the voltage received in the primary coil no longer being modulated in a manner equivalent to pure amplitude modulation. Instead, the voltage received in the primary coil in certain conditions is modulated by phase modulation. Since only an amplitude demodulator is provided at the station end, the demodulator can no longer demodulate the phase-modulated signal, and this is expressed as a so-called null point in the demodulation of the received signal.

The response circuit according to the invention results in that the alternating magnetic field can be subjected to both amplitude modulation and phase modulation. In this case, suitable activation and deactivation of the amplitude modulator and/or of the phase modulator can be used to offset the two modulations by 90°, for example, with respect to the modulation signal. If the levels of the two modulation types are then configured in a suitable manner such that they produce roughly equal sidebands in terms of amplitude, then one sideband of the modulation can be canceled out if the amplitude modulation and phase modulation are suitably offset. In terms of amplitude modulation, this avoids so-called "modulation null points" irrespective of manufacturing tolerances and varying distances between the response circuit and the station. Furthermore, both an amplitude modulator and a phase demodulator can demodulate the signal at any time, since the modulation of the alternating magnetic field according to the invention leads only to phase differences in the received data signal which, with suitable coding, do not interfere with the data signal.

In this case, according to the basic idea of the invention, it is sufficient for the phase modulation and the amplitude modulation at the response circuit end just to be configured such that one sideband of the alternating magnetic field is attenuated in comparison with the other sideband. Specifically, this measure on its own results in the advantage according to the invention, on the basis of which just an amplitude demodulator or just a phase demodulator is sufficient at the station end to demodulate the data signal modulated with the carrier signal.

According to the invention, the amplitude modulator is a resistor that can be connected in parallel with the secondary coil.

According to the invention, the phase modulator can be a capacitor that can be connected in parallel with the secondary coil, with the capacitor acting as a phase-shifter capacitor.

In a development of the invention, the response circuit is furthermore provided with an intermediate modulation apparatus for modulating the data signal with an auxiliary carrier signal. The frequency of the auxiliary carrier signal being, in particular, different than the frequency of the carrier signal or of the alternating magnetic field. The auxiliary carrier signal can advantageously be obtained from the carrier signal, to be precise by using a frequency divider in a clock derivation device. The system clock is then used indirectly to drive the phase modulator and/or amplitude modulator. However, the auxiliary carrier signal can also be produced in other ways.

According to the invention, the modulation result from the data signal and the auxiliary carrier signal is then modulated with the alternating magnetic field. This results in a particularly simple configuration of the amplitude demodulator, since the modulation result can be demodulated particularly easily.

The response circuit may in this case have a phase-shifting device, which may be configured such that at least one first control clock and at least one second control clock can be produced from the system clock. The control clocks are each shifted through a specific phase angle with respect to one another. In this case, the phase-shifting device is equipped with, in particular, at least one frequency divider. In this way, control clocks that are shifted through precisely 90° can be produced without any significant complexity from the carrier signal oscillation of the alternating magnetic field, and can be used directly for driving the amplitude modulator and phase modulator. The phase-shifted oscillations, which are derived from the carrier signal, may be used as auxiliary carrier signals onto which the data signal is modulated.

On the input side, the amplitude demodulator has, in particular, a bandpass filter, whose mid-frequency is essentially equal to the sum or to the difference of the frequencies of the carrier signal and the auxiliary signal.

The configuration of the data transmission circuit according to the invention is particularly simple if the response circuit and/or the station are configured such that they can process digital signals. Such circuits can be configured in a particularly simple manner using conventional digital circuit technology.

The invention also relates to a response circuit that is intended, in particular, for use in a transponder or in a smart card, with the response circuit being provided with a secondary coil and with an amplitude modulator for influencing the resistive load on the secondary coil. In this case, the amplitude modulator is configured such that an external alternating magnetic field can be modulated with a data signal produced, in particular, by the response circuit, when the response circuit is located in the area close to that primary coil which produces the external alternating magnetic field.

According to the invention, the response circuit in this case also has a phase modulator for influencing the electrical characteristics of the secondary coil, the amplitude modulator and/or the phase modulator being configured such that it or they can be driven by an activation signal.

The invention also relates to a method for modulating an external alternating magnetic field of a station with a modulation signal that is produced by a response circuit on the basis of a data signal. According to the invention, the modulation is carried out in such a manner that one sideband of the modulated alternating magnetic field is produced to be stronger than the other. In consequence, the signal power of the modulation of the alternating magnetic field is concentrated on one sideband channel, avoiding modulation null points.

Other features which are considered as characteristic for the invention are set forth in the appended claims.

Although the invention is illustrated and described herein as embodied in a data transmission circuit having a station and a response circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 1 thereof, there is shown a data transmission circuit according to the invention having a station 1 and a response circuit 2. The station 1 has a signal generator 3 that produces an alternating voltage signal, at a carrier frequency $\Omega$, in a primary circuit. The alternating voltage signal produced by the signal generator 3 is supplied to a primary coil 4, with a tuned-circuit capacitor 5a and a damping resistor 5b being provided in the circuit between the signal generator 3 and the primary coil 4. The station 1 also has a demodulator 6, which is connected in parallel with the primary coil 4. This view does not show the demodulator 6 in any more detail, but it may be configured either as an amplitude demodulator or as a phase demodulator.

Figure 1:
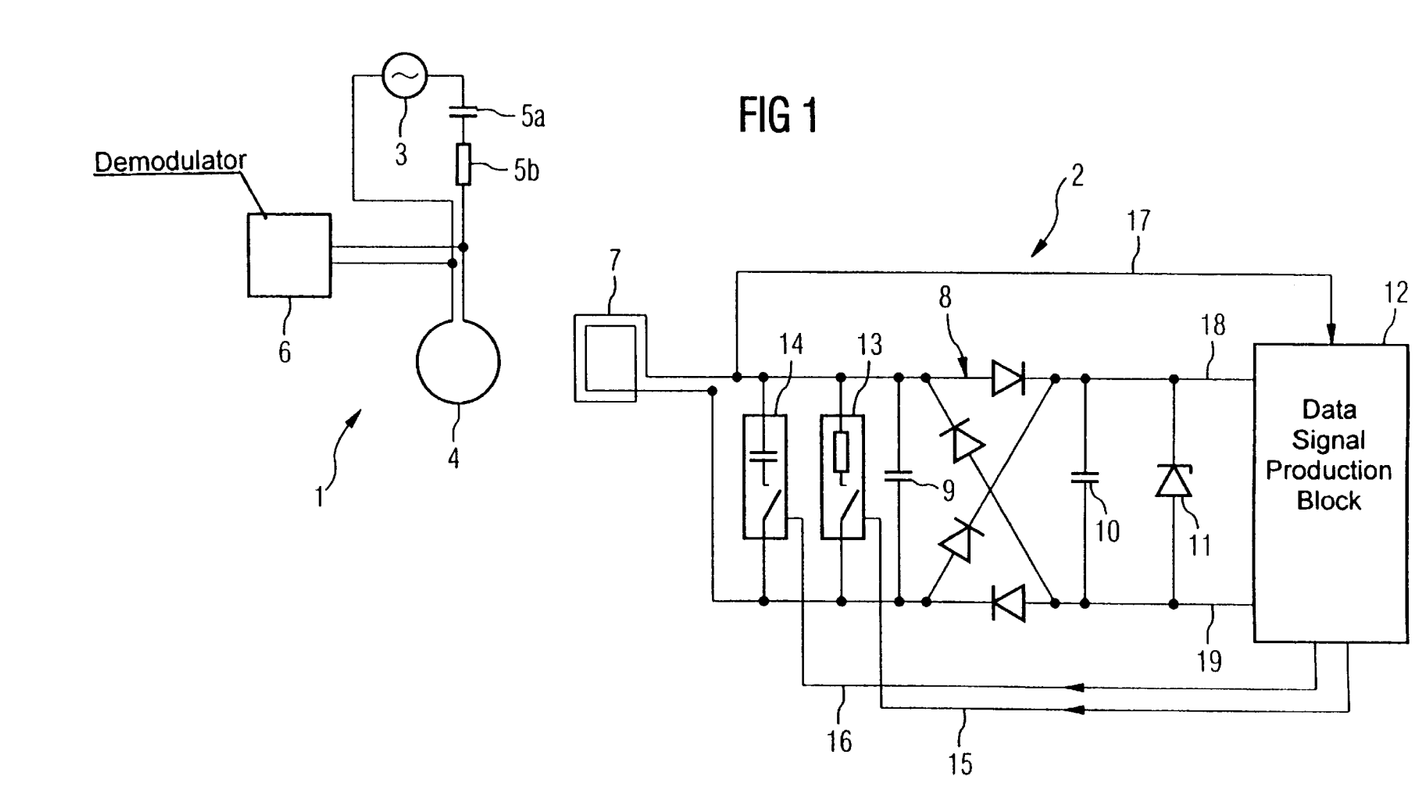
FIG. 1 is a diagrammatic, block circuit diagram of an outline sketch of a data transmission circuit having a station and a response circuit according to the invention.

The response circuit 2 has a secondary coil 7 which, when the data transmission circuit according to the invention is in use, is moved into the area close to the primary coil 4. The secondary coil 7 forms a secondary circuit with a tuned-circuit capacitor 9. The tuned-circuit capacitor 9 gives the secondary circuit a suitable resonant frequency. That part of the response circuit 2 that is connected to the secondary coil 7 and to the tuned-circuit capacitor 9 essentially includes a power supply assembly and a carrier-signal modulation assembly.

The power supply assembly for this purpose has a rectifier 8, which is provided at its output with a smoothing or filter capacitor 10. Furthermore, the power supply assembly has a voltage regulator in the form of a zener diode 11. In the embodiment 2 of the response circuit shown, the rectifier 8 is configured as a bridge rectifier composed of four diodes.

The carrier-signal modulation assembly essentially includes a data signal production block 12, an amplitude modulator 13 and a phase modulator 14. In this case, the amplitude modulator 13 is connected in parallel with the secondary coil 7, so that the latter can be loaded with an additional resistance. In comparison with this, the phase modulator 14 has a capacitor that can be connected in parallel with the secondary coil 7, so that its capacitive load can be varied. The amplitude modulator 13 and the phase modulator 14 may be configured either as linear modulators or as non-linear modulators.

In the exemplary embodiment shown, the amplitude modulator 13 is configured as a series circuit including a non-reactive resistor with an electrically operable switch. In contrast, the phase modulator 14 is configured as a series circuit including a capacitor and an electrically operable switch. The amplitude modulator 13 and the phase modulator 14 are connected via a respective connecting line 15 or 16 to the data signal production block 12, to be precise such that their switches can be operated on instruction from the data signal production block 12.

The data signal production block 12 is also connected directly to the secondary coil 7, via a carrier signal line 17. Finally, the data signal production block 12 also has power supply connections 18 and 19, by which it is connected to the power supply assembly of the response circuit 2.

Figure 2:
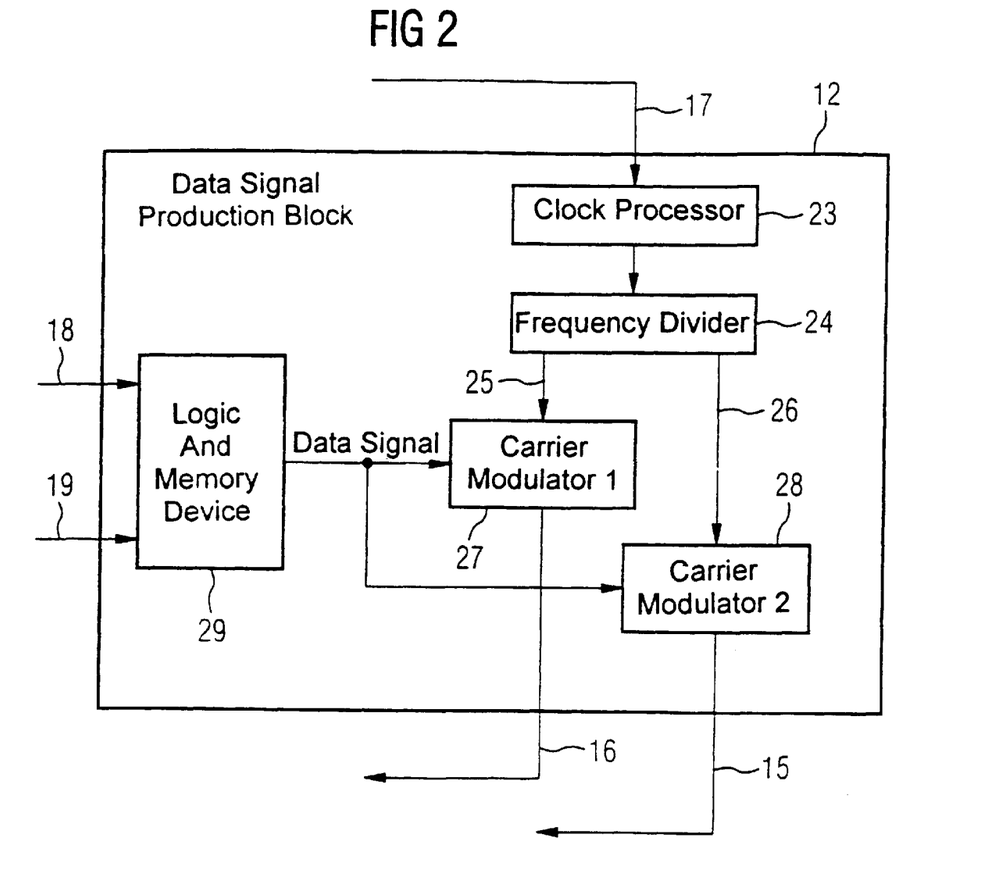
FIG. 2 is a block circuit diagram of a data signal production block for the response circuit from FIG. 1.

FIG. 2 shows the data signal production block 12 of the response circuit 1 in more detail. The data signal production block 12 has a clock processing apparatus 23, which is connected to the secondary coil 7 via the carrier signal line 17. The clock processing apparatus 23 is connected to a frequency divider 24 that also contains a phase-shifting device, which is not shown in this view. The frequency divider 24 produces two mutually phase-shifted signals at the same frequency, which are emitted via a first output line 25 and a second output line 26. The first signal produced by the frequency divider 24 is passed via the first output line 25 to a first auxiliary carrier modulator 27.

The second signal produced by the frequency divider 24 is passed via the second output line 26 to the second auxiliary carrier modulator 28. In order to output the signals from the first auxiliary carrier modulator 27 and from the second auxiliary carrier modulator 28, they are connected to the connecting lines 15 and 16, respectively, which have already been mentioned above.

The first auxiliary carrier modulator 27 and the second auxiliary carrier modulator 28 furthermore receive a data signal from a logic and memory device 29 which is also provided in the data signal production block 12. In the same way as all the other assemblies in the data signal production block 12, the logic and memory device 29 draws its operating power from the power supply connections 18 and 19. The first auxiliary carrier modulator 27 and the second auxiliary carrier modulator 28 are configured such that the signals produced by the frequency divider 24 can be modulated with the data signal from the logic and memory device 29.

In use, the data transmission circuit according to the invention behaves as described in the following text.

The signal generator 3 in the station 1 produces a radio-frequency alternating voltage signal, which is supplied to the primary coil 4. In this case, the tuned-circuit capacitor 5a produces an increase in the voltage in the primary coil 4, by virtue of its series resonance. The damping resistor 5b ensures the necessary bandwidth. The primary coil 4, which is connected to the two connections of the signal generator 3, in consequence has the alternating voltage signal produced by the signal generator 3 applied to it, at a carrier frequency $\Omega$. In consequence, an inductive alternating magnetic field is formed in the area of the primary coil 4, and acts as a so-called close field in the area around the primary coil 4. In this case, the magnetic field strength of the alternating magnetic field varies at the carrier frequency $\Omega$.

When the data transmission circuit according to the invention is in use, the response circuit 2 is moved into the area of the close field of the primary coil 4, to be precise in such a manner that the secondary coil 7 of the response circuit 2 is located in the immediate vicinity of the primary coil 4. The alternating magnetic field then induces an alternating voltage in the secondary coil, at a frequency that matches the carrier frequency $\Omega$. The alternating voltage is sampled and rectified by the power supply assembly in the response circuit 2. To this end, the rectifier 8 is connected to the two outputs of the secondary coil 7. A smoothed DC voltage is then produced at the output of the rectifier 8 owing to the action of the smoothing or filter capacitor 10, the magnitude of which DC voltage is limited by the zener diode 11, to be precise to a value which is required to operate the data signal production block 12. The smoothed and limited output voltage from the power supply assembly is applied via the power supply connections 18 and 19 to the data signal production block 12.

The data signal production block 12 then changes to an active state, in which, via the carrier signal line 17, it samples the voltage induced in the secondary coil 7. The clock processing apparatus 23 shown in FIG. 2 derives a system clock from the alternating voltage induced in the secondary coil 7, and passes this to the frequency divider 24.

A phase-shifting device, which is not shown in this view, is provided in the frequency divider 24 and uses the system clock to produce a first auxiliary carrier signal as well as a second auxiliary carrier signal, which is at the same frequency as the first auxiliary carrier signal, but, in terms of the phase of the first auxiliary carrier signal, is shifted through 90° with respect to the first auxiliary carrier signal.

In the auxiliary carrier modulators 27, 28 which are shown in FIG. 2, the data signal which is stored in the logic and memory block 29 is modulated with the auxiliary carrier signals to form a phase-modulation signal and an amplitude-modulation signal. The amplitude-modulation signal is then passed via the connecting line 15 to the amplitude modulator 13, while the phase-modulation signal is passed via the connecting line 16 to the phase modulator 14.

The amplitude modulator 13 and the phase modulator 14 load the secondary coil 7 in a manner corresponding to the signals supplied to them. Since the primary coil 4 and the secondary coil 7 are coupled, the load on the secondary coil 7 reacts through the phase modulator 14 and through the amplitude modulator 13 on the electrical characteristics of the primary coil 4. This changes the form and magnitude of the signal that results on the primary coil 4 and which is sampled by the demodulator 6. If the demodulator 6 (which is not shown in any more detail in this view) is configured in an appropriate manner, the data signal can be reconstructed from the alternating voltage, varied in this way, in the primary coil 4.

FIGS. 3 to 6 show how the modulation of the carrier signal with the auxiliary carrier signal operates according to the invention, with these illustrations being limited to those auxiliary carrier signals and phase and amplitude-modulation signals which are not influenced by the data signal, in order to make the basic idea of the invention clearer.

Figure 3:
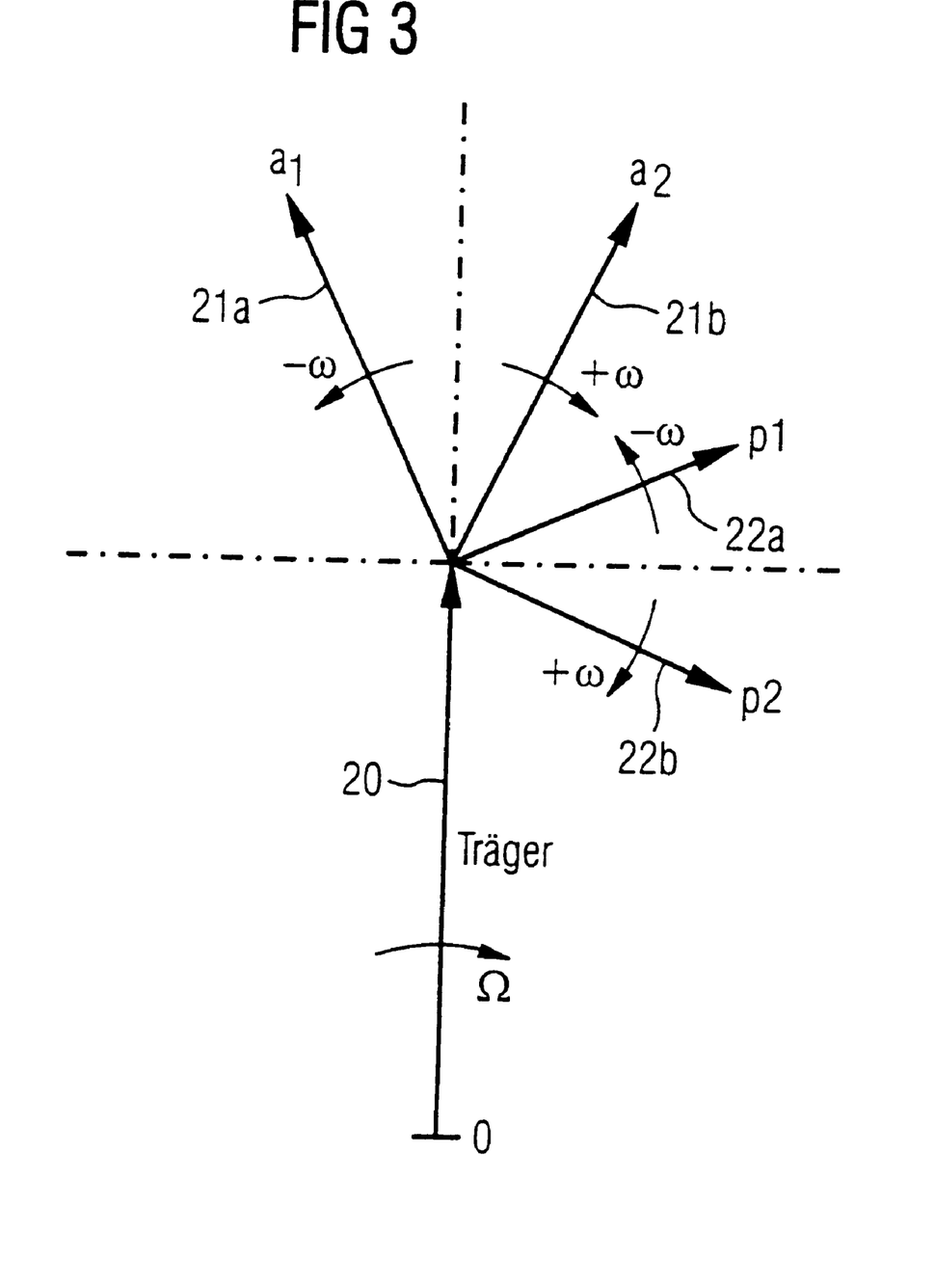
FIG. 3 is a vector diagram of a modulation of an alternating magnetic field of the data transmission circuit from FIG. 1.

FIG. 3 shows a vector illustration of modulation of the auxiliary carrier signals with the carrier signal, as is carried out by the amplitude modulator 13 and by the phase modulator 14. The carrier signal is in this case represented as a carrier-signal vector 20, which rotates at its carrier frequency $\Omega$ about the origin 0. The amplitude-modulation signal vectors 21a ($a_1$) and 21b ($a_2$) as well as the phase-modulation signal vectors 22a ($p_1$) and 22b ($p_2$) are shown rotating about the tip of the carrier-signal vector 20. Two vectors 21a, 21b and 22a, 22b, respectively, are in this case illustrated in each case both for the amplitude modulation of the data signal and for the phase modulation of the carrier signal, and respectively represent the two spectral components of the amplitude modulation and the phase modulation. The auxiliary carrier signals and phase and amplitude-modulation signals are at a constant frequency $\Omega$. The rotation rate $\omega$ of the spectral components with respect to the carrier signal corresponds to the frequency of the auxiliary carrier signal, which is the same for all the vectors 21a, 21b, 22a, 22b for the amplitude modulation and for the phase modulation. The vectors 21a and 22a for the amplitude modulation and phase modulation, respectively, rotate in the opposite direction to the vectors 21b and 22b, respectively, for the amplitude modulation and phase modulation, respectively, however.

Figure 4:
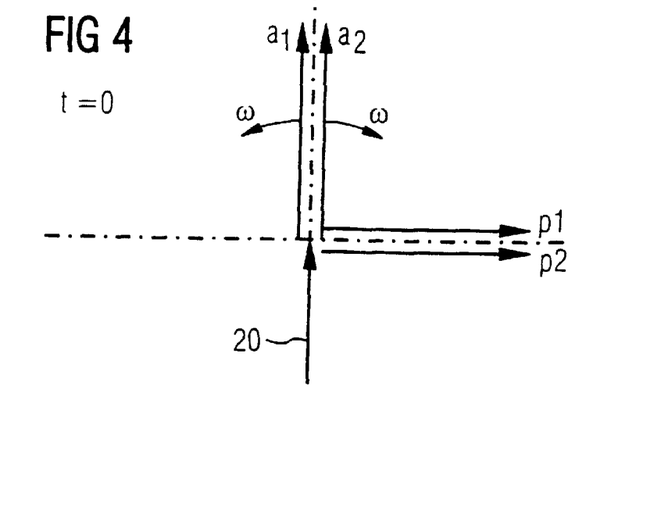
FIG. 4 is a vector diagram of the modulation of the alternating magnetic field of the data transmission circuit from FIG. 1 at a time t=0.

FIG. 4 shows the vector diagram from FIG. 3 at a time t=0. The carrier-signal vector 20 rotates at the carrier frequency $\Omega$, while the amplitude-modulation vectors $a_1$, $a_2$ as well as the phase-modulation vectors $p_1$, $p_2$ are stationary.

The amplitude modulation starts at the time t=0. In consequence, the amplitude-modulation vectors $a_1$, $a_2$ start to rotate at the rotation rate $\omega$ about the tip of the carrier-signal vector 20, with one spectral component $a_1$ rotating counterclockwise in the illustration shown, while the other spectral component $a_2$ rotates clockwise.

Figure 5:
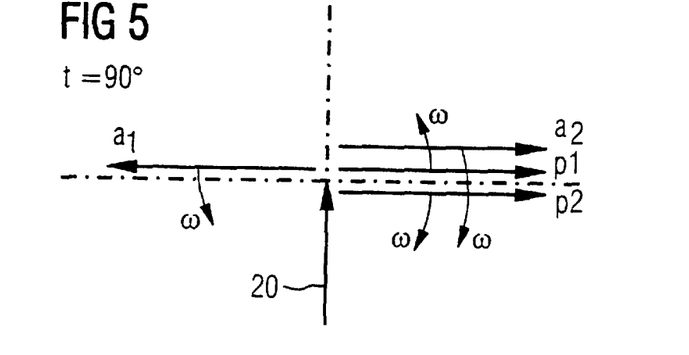
FIG. 5 is a vector diagram of the modulation of the alternating magnetic field of the data transmission circuit from FIG. 1 at a time t=90°.

FIG. 5 shows the vector diagram for modulation of the alternating magnetic field of the data transmission circuit at the time t=90°/$\omega$. At this time, the spectral components $a_1$, $a_2$ of the amplitude modulation have moved from the vertical position shown in FIG. 4 into a horizontal position, so that the one spectral component $a_2$ of the amplitude modulation coincides with the two spectral components $p_1$, $p_2$ of the phase modulation, while the other spectral component $a_1$, of the amplitude modulation is opposite the spectral components $a_2$, $p_1$, $p_2$. The spectral components $p_1$, $p_2$ of the phase modulation start precisely at this time. The one spectral component $p_1$ then starts to rotate counterclockwise at the frequency $\omega$, while the other spectral component $p_2$ starts to rotate clockwise at the frequency $\omega$. As can clearly be seen from this illustration, the spectral component $a_1$ cancels out the spectral component $p_1$, provided the amplitudes of the spectral components $a_1$ and $p_1$ are the same. The remaining spectral components $a_2$ and the other spectral component $p_2$ of the phase modulation reinforce one another.

Figure 6:
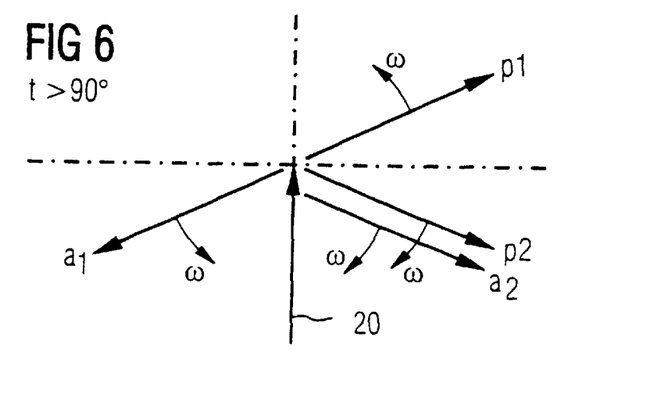
FIG. 6 is a vector diagram of the modulation of the alternating magnetic field of the data transmission circuit from FIG. 1 at a time t>90°.

FIG. 6 shows the vector diagram from FIG. 3 at the time t>90°/$\omega$. At this time, the spectral components $a_1$, $a_2$ of the amplitude modulation have moved on through a specific angle from the position in FIG. 5. The spectral components $p_1$, $p_2$ have likewise moved on through a specific angle from the position in FIG. 5. The angles through which the spectral components $a_1$, $a_2$ and $p_1$, $p_2$ have moved on from the position in FIG. 5 in each case match, since the spectral components are each rotating at the same frequency $\omega$ about the tip of the carrier-signal vector 20. As can be seen particularly well from the illustration, the spectral component $a_1$ of the amplitude modulation and the spectral component $p_1$ of the phase modulation cancel one another out, while the spectral components $a_2$ of the amplitude modulation and $p_2$ of the phase modulation reinforce one another.

In the case of the response circuit according to the invention, the phase modulation, for example, thus leads the amplitude modulation by 90° of the signal period at the frequency $\omega$ of the auxiliary carrier signal. However, it is also feasible for the phase modulation thus to lag the amplitude modulation by 90° of the signal period at the frequency $\omega$ of the auxiliary carrier signal. In the former case, the directions of the vectors 21b and 22b always coincide, while the directions of the vectors 21a and 22a are always mutually opposite. There are thus no modulation null points. If the lengths of the vectors 21a and 22a are the same, one sideband is then completely canceled out, so that the signal power for modulation of the alternating magnetic field is concentrated on one sideband.

I claim:

1. A data transmission circuit, comprising:
   a station having an amplitude demodulator, a primary coil connected to said amplitude demodulator, and a signal generator connected to said primary coil for producing an alternating magnetic field at a carrier frequency; and
   a response circuit having a secondary coil and an amplitude modulator for influencing a load on said secondary coil, said amplitude modulator configured such that the alternating magnetic field can be modulated with a data signal, said response circuit also having a phase modulator for influencing electrical characteristics of said secondary coil, and at least one of said amplitude modulator and said phase modulator to be driven by at least one modulation signal.

2. The data transmission circuit according to claim 1, wherein said response circuit is part of a smart card.

3. A data transmission circuit, comprising:
   a station having a phase demodulator, a primary coil connected to said phase demodulator, and a signal generator connected to said primary coil for producing an alternating magnetic field; and
   a response circuit having a secondary coil and an amplitude modulator for influencing electrical characteristics of said secondary coil, said amplitude modulator configured such that the alternating magnetic field can be modulated with a data signal, said response circuit also having a phase modulator for influencing the electrical characteristics of said secondary coil, and at least one of said amplitude modulator and said phase modulator can be driven by at least one modulation signal.

4. The data transmission circuit according to claim 3, wherein said response circuit is part of a smart card.

5. The data transmission circuit according to claim 1, wherein at least one of said amplitude modulator and said phase modulator can be driven such that a phase modulation is offset with respect to a phase of an amplitude modulation.

6. The data transmission circuit according to claim 5, wherein at least one of said amplitude modulator and said phase modulator can be driven such that the phase modulation leads the amplitude modulation by 90° with respect to a signal period of the at least one modulation signal.

7. The data transmission circuit according to claim 5, wherein at least one of said amplitude modulator and said phase modulator can be driven such that the phase modulation lags the amplitude modulation by 90° with respect to a signal period of the at least one modulation signal.

8. The data transmission circuit according to claim 1, wherein said amplitude modulator is a resistor that can be connected in parallel with said secondary coil.

9. The data transmission circuit according to claim 1, wherein said phase modulator is a capacitor that can be connected in parallel with said secondary coil.

10. The data transmission circuit according to claim 1, wherein said response circuit has at least one intermediate modulation apparatus for modulation of the data signal with an auxiliary carrier signal.

11. The data transmission circuit according to claim 1, wherein said response circuit has a clock derivation device for deriving an auxiliary carrier signal from the alternating magnetic field.

12. The data transmission circuit according to claim 11, wherein said response circuit has a phase-shifting device such that at least a first auxiliary carrier signal and at least a second auxiliary carrier signal can be produced from said clock derivation device, the first auxiliary carrier signal and the second auxiliary carrier signal are each phase-shifted by a specific amount with respect to one another.

13. The data transmission circuit according to claim 12, wherein said phase-shifting device has at least one frequency divider.

14. The data transmission circuit according to claim 11, wherein said amplitude demodulator has an input side and a bandpass filter disposed on said input side.

15. The data transmission circuit according to claim 14, wherein said bandpass filter has a mid-frequency substantially equal to a sum or to a difference of frequencies of a carrier signal and the auxiliary carrier signal.

16. The data transmission circuit according to claim 1, wherein at least one of said response circuit and said station are circuits for processing digital signals.

17. The data transmission circuit according to claim 3, wherein at least one of said amplitude modulator and said phase modulator can be driven such that a phase modulation is offset with respect to a phase of an amplitude modulation.

18. The data transmission circuit according to claim 17, wherein at least one of said amplitude modulator and said phase modulator can be driven such that the phase modulation leads the amplitude modulation by 90° with respect to a signal period of the at least one modulation signal.

19. The data transmission circuit according to claim 17, wherein at least one of said amplitude modulator and said phase modulator can be driven such that the phase modulation lags the amplitude modulation by 90° with respect to a signal period of the at least one modulation signal.

20. The data transmission circuit according to claim 3, wherein said amplitude modulator is a resistor that can be connected in parallel with said secondary coil.

21. The data transmission circuit according to claim 3, wherein said phase modulator is a capacitor that can be connected in parallel with said secondary coil.

22. The data transmission circuit according to claim 3, wherein said response circuit has at least one intermediate modulation apparatus for modulation of the data signal with an auxiliary carrier signal.

23. The data transmission circuit according to claim 3, wherein said response circuit has a clock derivation device for deriving an auxiliary carrier signal from the alternating magnetic field.

24. The data transmission circuit according to claim 23, wherein said response circuit has a phase-shifting device configured such that at least a first auxiliary carrier signal and at least a second auxiliary carrier signal can be produced from said clock derivation device, the first auxiliary carrier signal and the second auxiliary carrier signal are phase-shifted by a specific amount with respect to one another.

25. The data transmission circuit according to claim 24, wherein said phase-shifting device has at least one frequency divider.

26. The data transmission circuit according to claim 23, wherein said phase demodulator has an input side and a bandpass filter disposed on said input side.

27. The data transmission circuit according to claim 26, wherein said bandpass filter has a mid-frequency substantially equal to a sum or to a difference of frequencies of a carrier signal and the auxiliary carrier signal.

28. The data transmission circuit according to claim 3, wherein at least one of said response circuit and said station are circuits for processing digital signals.

29. A response circuit, comprising:
   a secondary coil;
   an amplitude modulator for influencing electrical characteristics of said secondary coil, said amplitude modulator configured such that an external alternating magnetic field can be modulated with a data signal; and a phase modulator for influencing the electrical characteristics of said secondary coil, and at least one of said amplitude modulator and said phase modulator can each be driven by at least one modulation signal.

30. The response circuit according to claim 29, wherein the response circuit is used in one of a transponder and a smart card.

31. An improved method for modulating an external alternating magnetic field of a station, the improvement which comprises:
producing a modulation signal via a response circuit on a basis of a data signal for modulating the external alternating magnetic field with amplitude modulation and with phase modulation, and carrying out the modulating such that one sideband of a modulated alternating magnetic field is produced more strongly than the other sideband.

32. The method according to claim 31, which comprises carrying out the amplitude modulation with a phase shift with respect to the phase modulation.

33. The method according to claim 32, which comprises carrying out the amplitude modulation such that the phase shift is 90° and is one of a leading and lagging phase shift.

34. The method according to claim 31, which comprises:
carrying out the amplitude modulation using an amplitude modulator driven by an amplitude modulation signal;
carrying out the phase modulation using a phase modulator driven by a phase modulation signal; and
producing at least one of the amplitude modulation signal and the phase modulation signal from modulation of the data signal with in each case one auxiliary carrier signal.

35. The method according to claim 34, which comprises deriving the one auxiliary carrier signal by frequency division from the external alternating magnetic field.

36. The method according to claim 34, which comprises using a plurality of auxiliary carrier signals having a phase shift of 90° between them during the producing step.

* * * * *